US008442716B2

(12) United States Patent
Epshtein et al.

(10) Patent No.: US 8,442,716 B2
(45) Date of Patent: May 14, 2013

(54) IDENTIFYING PHYSICAL LOCATIONS OF ENTITIES

(75) Inventors: Boris Epshtein, Bothell, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/916,554

(22) Filed: Oct. 31, 2010

(65) Prior Publication Data

US 2012/0109942 A1    May 3, 2012

(51) Int. Cl.
*G06F 19/00* (2011.01)
(52) U.S. Cl.
USPC .......... 701/33.4; 701/300; 701/410; 701/439; 701/454; 705/1.1; 705/14.73; 705/400; 30/32; 30/60; 340/995.24; 455/446
(58) Field of Classification Search .................. 701/300, 701/410, 439, 454, 33.4; 30/32, 60; 340/995.24; 705/1.1, 14.73; 455/446
See application file for complete search history.

(56) References Cited

U.S. PATENT DOCUMENTS

| 5,682,525 | A | 10/1997 | Bouve et al. | |
| 5,941,930 | A * | 8/1999 | Morimoto et al. | 701/532 |
| 5,961,569 | A | 10/1999 | Craport et al. | |
| 6,853,917 | B2 * | 2/2005 | Miwa | 701/467 |
| 7,286,931 | B2 * | 10/2007 | Kawasaki | 701/426 |
| 7,606,581 | B2 | 10/2009 | Riise et al. | |
| 2002/0002552 | A1 | 1/2002 | Schultz et al. | |
| 2006/0123050 | A1 * | 6/2006 | Carmichael et al. | 707/104.1 |
| 2006/0218114 | A1 | 9/2006 | Weare et al. | |
| 2007/0078596 | A1 * | 4/2007 | Grace | 701/209 |
| 2007/0093257 | A1 | 4/2007 | McDougall et al. | |
| 2008/0273795 | A1 | 11/2008 | Ofek et al. | |
| 2008/0319659 | A1 | 12/2008 | Horvitz et al. | |
| 2009/0222432 | A1 | 9/2009 | Ratnakar | |
| 2009/0279794 | A1 | 11/2009 | Brucher et al. | |
| 2010/0250126 | A1 | 9/2010 | Epshtein et al. | |
| 2010/0273418 | A1 | 10/2010 | Eruchimovitch et al. | |

FOREIGN PATENT DOCUMENTS

| CN | 101689282 A | 3/2010 |
| JP | 2003247837 A | 9/2009 |

OTHER PUBLICATIONS

"International Search Report and the Written Opinion of the International Searching Authority", Mailed Date: Apr. 10, 2012, Application No. PCT/US2011/056493, Filed Date: Oct. 15, 2011, 9 pages.
Sears, Bryan, "Geocoding Challenges: Why Accuracy Matters", Retrieved at << http://www.directionsmag.com/article.php?article_id=558 >>, Apr. 20, 2004, 3 pages.
"What Is Location Intelligence And Why Is It Important?", Retrieved at << http://fbhalper.wordpress.com/2009/09/29/what-is-location-intelligence-and-why-is-it-important/ >>, Sep. 29, 2009, 2 pages.

(Continued)

*Primary Examiner* — McDieunel Marc (57) ABSTRACT

Businesses and other entities may be assigned geographic locations based on various types of data. In one example, entities are associated with segments in a street grid. Additionally, data points (e.g., geotagged blog entries or other online information) are associated with segments in the street grid. For a given segment, data points are compared with entities to identify possible matches between the data points and the entities. Each match is assigned a score, and each match represents a possible physical location for a given entity. The locations of entities on the street are assigned, from among the matches, based on which assignment of entities optimizes the aggregate score for the segment, while satisfying one or more physical constraints.

20 Claims, 5 Drawing Sheets

OTHER PUBLICATIONS

"Location Intelligence: More Than Just Plotting Map Coordinates", Retrieved at << http://1pagemarketing.com/?p=7077>>, Jun. 14, 2010, 5 pages.

"Geocoding for Locating Customers", Retrieved at << http://www.pbinsight.com/solutions/by-business-need/locate-my-customers/geocoding1/ >>, undated document retrieved on Jul. 12, 2010, 1 page.

"Location Intelligence Solutions", Retrieved at <<http://www.johnstonmclamb.com/downloads/Location_Intelligence_Solutions.pdf >>, undated document retrieved on Jul. 12, 2010, 2 pages.

"Search Report", Chinese Patent Application No. 201110334047.8 (counterpart of U.S. Appl. No. 12/916,554), dated Dec. 31, 2012.

\* cited by examiner

IDENTIFYING PHYSICAL LOCATIONS OF ENTITIES

BACKGROUND

In many applications, it is relevant to know the actual location of a business or other entity. For example, map applications often show the presumed geographic location of businesses on a street grid. Such map applications may also provide street-level images, and may superimpose the name of a business on its presumed location in the image. A geographic search application may provide a map showing the location of a business or entity that matches a query.

In order to show the location of a business or other entity on a map or image, an application has to determine the business's location. The location is often inferred from the entity's street address. For example, a particular block of a particular street may have buildings that are numbered one through one hundred. If an entity is at number fifty, it can be inferred that the entity is roughly half the way down the block. Moreover, since fifty is an even number, it is usually possible to infer which side of the street the entity is on. Additionally, some data sources may provide actual latitude and longitude coordinates of an entity.

However, determining an entity's location from street numbers, or even from certain sources of latitude and longitude coordinates, may result in an inaccurate location. The relationship between street numbers and locations along a block might not be linear, since numbers can sometimes "bunch up" toward one end of the street. Some buildings are not placed in a simple line. For example, a street might have a U-shaped courtyard, and several addresses on the street might be located around the courtyard. As to latitude and longitude coordinates, while these may provide the appearance of pinpoint accuracy, the actual coordinate that is reported might not correspond to an entity's actual location on the street. For example, a particular coordinate might refer to the back of a store that extends far back from the street, or might refer to a parking lot that is located on the side of the store.

Thus, when one wants to determine the actual location of an entity, relying on street numbers or even geo-coordinates may provide inaccurate information.

SUMMARY

The locations of businesses or other entities may be mined from various sources. In order to assess the locations of entities, a street map is divided into segments. Each segment may be one side of a street block—e.g., the 100-199 block on the northbound side of a particular street. Then, a list is created of all entities that appear to lie on that segment. The determination of what entities lie on a segment may be based on directories that list the street addresses of entities and/or the geographic locations of entities. For the purpose of identifying which businesses are on a segment, any entity whose street address corresponds to that segment may be presumed to be on the segment. Moreover, as to entities for which geo coordinates are available, the entity may be presumed to be on the segment to which it is closest.

Geo-tagged data points may also be placed onto segments. Data points may be any type of information that is associated with a geographic location, such as photos, microblog entries, geo-tagged queries, text recovered from street-side images, locations reported by businesses or other entities on their own web sites, locations on a map marked by users or business owners, etc. For example, if a user creates a microblog entry from his phone saying, "I'm at Starbucks," and the global positioning system (GPS) receiver on his phone reports a particular location at the time of the entry, then the text "I'm at Starbucks" is an example of a geo-tagged data point. Each such geo-tagged data point may be placed onto whichever segment is closest to that data point. (Collection of a user's location may be done pursuant to appropriate permission obtained from the user.)

Geo-tagged data points in a segment are then matched against entities in the segment. For example, a microblog entry saying "I'm at Starbucks" could be matched with a Starbucks coffee house that is located in the segment. Or, the entry "I'm shopping for a television" could be matched with any electronics store in the segment. A confidence score may be assigned to each match, representing the level of confidence that the match is correct. Since each data point is associated with a geographic location, the set of matches for a given entity represents the set of geographic coordinates at which an entity might be located.

Once the set of matches has been created, an optimization process chooses the actual locations of the entities by attempting to maximize the aggregate confidence score for a segment. The optimization process may be subject to certain geographic constraints, such as ensuring that known street-address numbers increase monotonically throughout the segment. The choice of entity locations that maximizes the aggregate confidence score may be presumed to be the actual locations of the entities. These locations may be recorded in a database, and may be used by applications such as on-line maps.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Many applications make use of the actual location of a business or other entity. For example, some search applications allow users to search for businesses that satisfy a geographic constraint. Some map applications attempt to show the exact location of certain businesses, either on an abstract map of a city or superimposed over street-level images of the city. Some applications combine these functions—e.g., a search engine might a set of businesses in response to a query, while also showing the location of the businesses on a map.

In general, the location of a business or other entity is inferred from street addresses. Certain information about a street grid might be known, such as which block of a street contains addresses numbered 100-199, and which side of the street contains the even-numbered addresses. However, any inference as to an entity's location from its address is an approximation. Sometimes, actual "on the ground" data can provide a more accurate indication of a business's address. Such on-the-ground data might include an entity's self-report of its latitude and longitude coordinates. Or, in another example, such data might include a statement from a person, such as a microblog entry that contains the text, "I'm at Starbucks", along with the coordinates from which the entry was transmitted (where the person may give appropriate permission to make the coordinates public).

The subject matter described herein allows this on-the-ground data to be harvested, in order to discover accurate locations of businesses and other entities. Entities are assigned to segments of a street grid. A segment is a block containing a particular range of numbers (generally only the even number or odd numbers). The block of "$1^{st}$ street" that contains even building numbers in the range 100-199 is an example of a segment. Entities are assigned to segments based on their known addresses, which might be learned from a directory. Or, if no address is available, an entity can be assigned to a segment based on geographic proximity to the segment. Additionally, geo-tagged data points that might provide clues as to the locations of entities are assigned to segments. A geo-tagged data point is any type of information that is associated with a known geographic location, and the data points can be assigned to segments based on their proximity to the segments. Data points that are very close to each other, and that relate to the same entity, can be clustered in an optional pre-processing action, thereby reducing the number of data points that the technique has to process. Once the data points and entities are assigned to segments, data points and entities assigned to the same segment are matched with each other, and each match receives a score that represents the level of certainty that the data point truly matches the entity. E.g., a microblog entry that says, "I'm at Starbucks" would receive a very high certainty score for matching a Starbucks coffee house. A microblog entry that says "I'm drinking coffee" would probably match the Starbucks, but with a lower level of certainty since the entry does not identify the matching entity by name. Once all of the matches have been scored, each entity may be assigned a location along the segment from among the matching set of data points. The process of assigning locations to entities generally seeks to maximize the aggregate score for the segment, which often involves picking the highest scoring matches. However, there may be certain physical constraints. For example, the building numbers on a street normally increase monotonically, so an assignment of locations that results in addresses that go up and down along the street, rather than increasing monotonically, could be rejected. Once entities have been assigned locations, the locations may be stored in a database, which may be used by search applications, map applications, etc.

Figure 1:
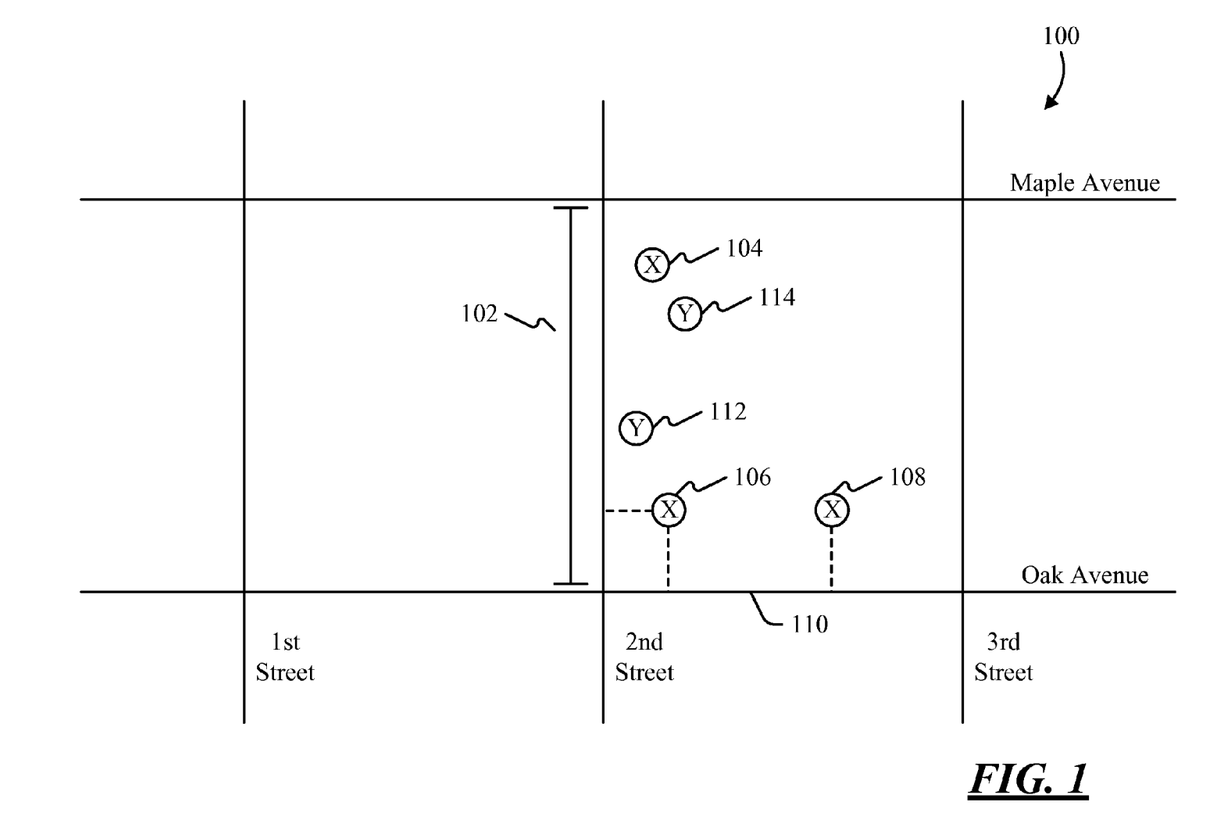
FIG. 1 is a block diagram of an example street grid.

Turning now to the drawings, FIG. 1 shows an example street grid 100. Street grid 100 has several streets: $1^{st}$ Street, $2^{nd}$ Street, $3^{rd}$ Street, Maple Avenue, and Oak Avenue, where the avenues are at right angles to the streets. The length of one side of a street between two avenues (or on one side of an avenue between two streets) constitutes a segment. For example, segment 102 is the length of $2^{nd}$ Street that runs between Maple and Oak Avenues. Each street has two sides, and a segment may refer to a single side of the street. In this example, segment 102 includes the side of $2^{nd}$ Street that is closer to $3^{rd}$ street than it is to $1^{st}$ Street.

Entities (e.g., businesses) and data points may be associated with a particular segment. In one example, an entity is associated with a particular segment because its street address (as listed, for example, in a directory) corresponds to the segment—i.e., its address falls within the numerical range that defines the segment. In FIG. 1, entities are marked with a circled "X", and three entities 104, 106, and 108 are shown. Thus, entity 104 might be a restaurant that is listed in a directory as being located at 117 $2^{nd}$ Street. If segment 102 is the odd-numbered side of the Maple-to-Oak block of $2^{nd}$ Street, then this address places entity 104 on segment 102. On the other hand, entity 106 might not have a known address, but latitude and longitude data might place that entity at the position shown in FIG. 1. Since entity 106 is slightly closer to segment 102 than it is to segment 110 (as indicated by the respective lengths of the dotted lines), entity 106 is determined to be associated with segment 102. On the other hand, entity 108 is closer to segment 110 than it is to segment 102 (as indicated by the dotted line extending from entity 108), so entity 108 is determined to be associated with segment 110.

Geo-tagged data points also can be associated with segments. In FIG. 1, geo-tagged data points are marked with a circled "Y", and two such data points 112 and 114 are shown. Geo-tagged data points may be any type of available information that can be associated with a geographic location. Some non-limiting examples of data points include: microblog entries (e.g., "I'm at Starbucks" plus coordinates); queries (e.g., "prices for Sharp television" plus coordinates); text recovered from street-side images (with the coordinates at which the image was taken); positions on a map marked by users or businesses; or maps or other location information found on business web sites. For example, a person may generate a microblog entry from his phone. If the phone is equipped with a GPS receiver, or other type of location device, then the phone may tag the microblog entry with the location at which the entry was generated. (The person carrying the phone may be asked to give appropriate permission for his location to be used in this manner.) An example of a microblog entry is a statement such as, "I'm at Starbucks". When such a statement is associated with a geographic location, the statement can be used to identify the actual location of a Starbucks coffee house, using techniques that are described below. However, before a determination is made as to which entity a geo-tagged data point relates to, that data point is first associated with a particular segment. A data point can be assigned to the segment that is closest to the location associated with that data point. For example, in FIG. 1 data points 112 and 114 are closest to segment 102, so they are assigned to segment 102.

Once entities and data points have been assigned to segments, the data points may be used to help to determine the actual geographic locations of entities in the segment. The basic idea is to match one or more data point with an entity, thereby creating a list of possible locations for the entity. For example, suppose there is a Starbucks coffee house on segment 102, and there are also three data points on segment 102 that appears to be associated with Starbucks. For example, one such data point might be a web site purporting to list the geographic location of Starbucks. Another data point might be a microblog entry stating, "I'm at Starbucks," where the entry has been tagged with the geographic location at which the entry was created. Another data point might be another microblog entry stating, "I'm at a coffee house", which—even though it does not mention Starbucks by name—can be associated with Starbucks due to the fact that Starbucks is a coffee house located on the same segment as the data point. Each data point is associated with a different geographic location along the segment, and thus these three data points provide three different candidate locations for Starbucks. These different candidates may be scored, where the score represents the level of certainty that the candidate correctly identifies the entity's location. Once all of the entities on a segment are matched with data points to create these candidate locations, the actual location of the entities on the segment is chosen, from among the candidates, so as to choose candidates whose aggregate score is maximal among the possibilities. Although the process of choosing the locations of the entities may attempt to maximize the aggregate score, certain limiting rules may be followed—e.g., there may be a rule that building numbers along a segment increase monotonically, based on the assumption that real building numbers do not "cross over". (That is, one would expect building numbers on a real street to run in a sequence such as "2, 6, 16, . . . ", and one would not expect to encounter a sequence like "2, 6, 16, 12, . . . ")

Figure 2:
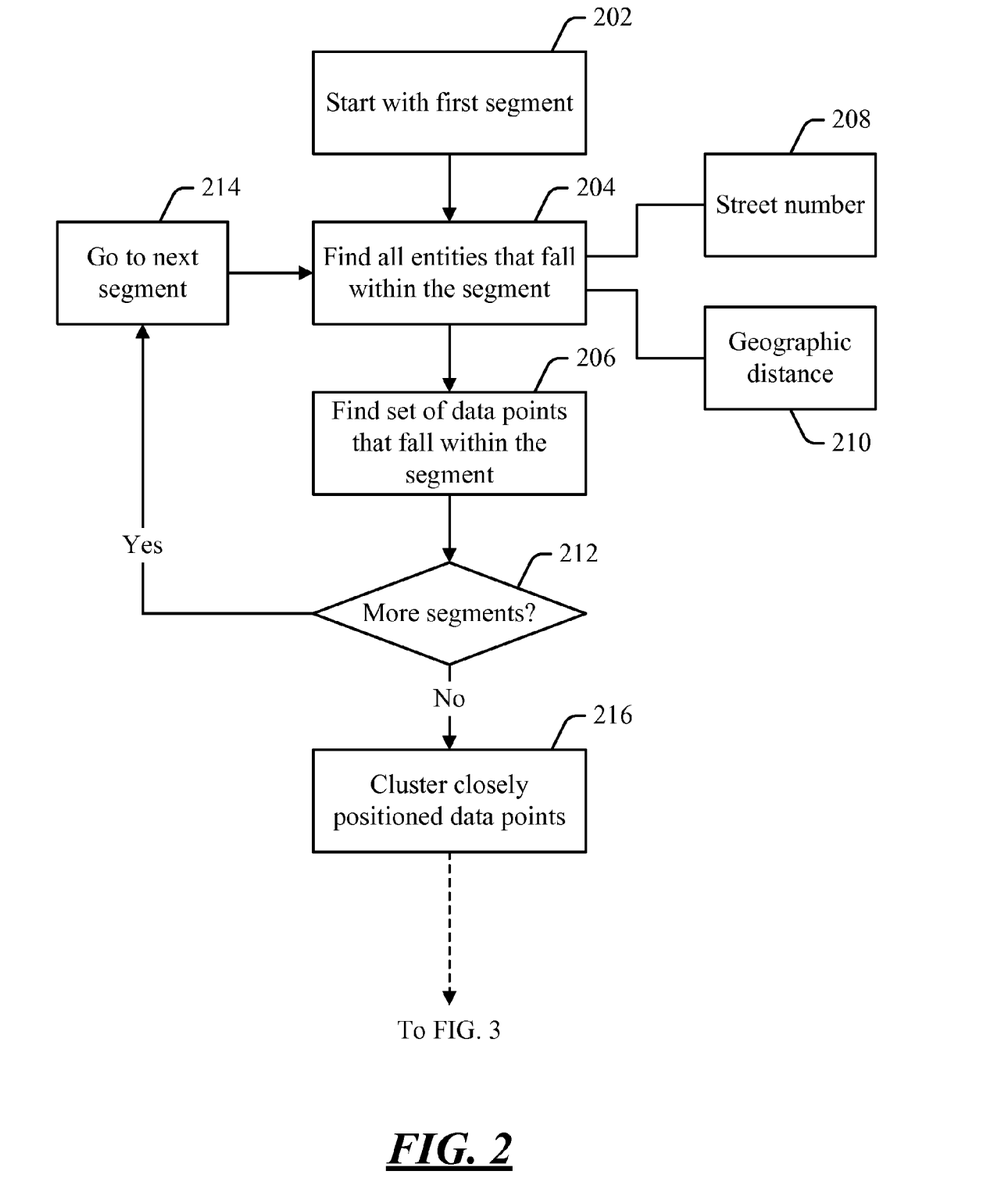
FIGS. 2 and 3 are, collectively, a flow diagram of an example process of determining the locations of entities.
Figure 3:
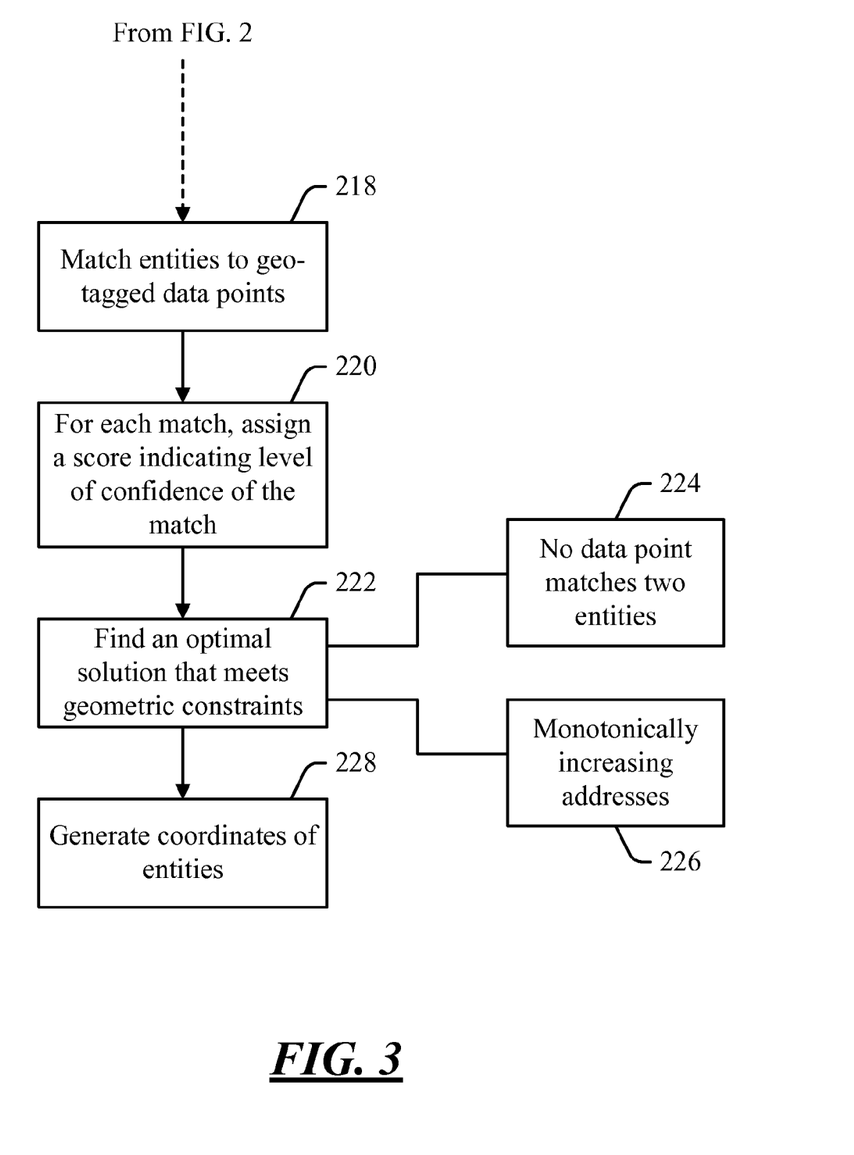
Figure 4:
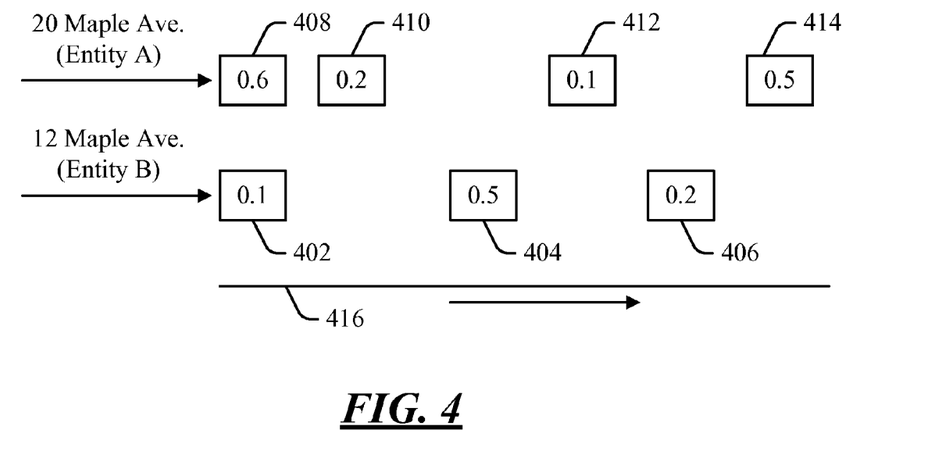
FIG. 4 is a block diagram showing an example assignment of locations to entities.

FIGS. 2 and 3 show an example process for carrying out the foregoing technique. Before turning to a description of FIGS. 2 and 3, it is noted that the flow diagrams contained herein (in FIGS. 2-4) are described, by way of example, with reference to components shown in FIG. 1, although these processes may be carried out in any system and are not limited to the scenario shown in FIG. 1. Additionally, each of the flow diagrams in FIGS. 2-4 shows an example in which stages of a process are carried out in a particular order, as indicated by the lines connecting the blocks, but the various stages shown in these diagrams can be performed in any order, or in any combination or sub-combination.

The process of FIGS. 2 and 3 first goes through a set of segments to determine which entities and data points are associated with that segment. Thus, the process starts with a first segment at 202. The process then continues on to find all of the entities (block 204) and data points (block 206) that are associated with the segment. As described above, determining whether an entity is associated with a segment may be determined by street number of the entity's address, if known (block 208). Or, as another example, an entity may be associated with a segment based on its geographic distance to the segment, if the geographic position of the entity is known (block 210). One example of assigning an entity to a segment based on street number is: if the segment contains even-numbered addresses from 100-198 along Maple Avenue and a direction lists the entity in question as having the address 142 Maple Avenue, then the street number of the entity falls within the segment's range, so the entity can be assigned to that segment. With reference to FIG. 1, the assignment of entity 104 to segment 102 is an example of assigning an entity to a segment using this technique. One example of assigning an entity to a segment based on geographic distance is this: Suppose there are two segments A and B. If some point along segment A is distance D from the entity, and there is no point along segment B that is less than distance D from the entity, then the entity is assigned to segment A. With reference to FIG. 1, the assignment of entity 106 to segment 102 (as opposed to segment 110) is an example of assigning an entity based on the entity's geographic position.

It is noted that the assignment of data points to segments (block 206) may be performed using the same techniques described in connection with blocks 208 and 210 above. Data points, it is noted, are likely to be associated with geographic coordinates obtained from the device on which the data point was created (e.g., a microblog entry created with a phone, and tagged with the latitude and longitude at which the phone was located when the entry was created). Thus, a data point is normally assigned to a segment based on its geographic proximity to the segment. However, if street address information is available for a data point, then the street number information could also be used to assign a data point to a segment.

After entities and data points have been assigned to a segment, the process may determine (at 212) whether there are additional segments to consider. If there are, then the process goes to the next segment (at 214), and returns to block 204 to assign entities and data points to the next segments. If there are no additional segments to consider, then the process continues to block 216.

At block 216, closely positioned data points that appear to relate to the same entity may be clustered together. (Some type of preliminary determination can be made that the points relate to the same entity—e.g., two microblog entries that are geographically close to each other and both mention the word "coffee" might be preliminarily determined to relate to the same coffee house.) For example, if two data points have geographic tags indicating that they are five feet from each other (or that satisfy some other proximity criterion), then it may be assumed that the two points refer to the same building. In addition to the closeness of the locations, other types of information might be used to determine which data points come from the same building. For example, if two microblog entries are transmitted to a microblogging service from the same WiFi router, then it may be determined that the two data points were generated in the same building. (The identity of the router may be included in metadata or packet information that is sent with the microblog entries. An agreement, to which a person consents when using a WiFi hotspot, could specify that such information would be transmitted. In this way, appropriate consent to collect such information could be obtained from a user.) As a result of block 216, several points that appear to be very close to each other can be collapsed into the a single geographic point. Doing so reduces the number of geographic points that would have to be analyzed by subsequent actions. Doing so also reduced "noise" in the assessment of where a given entity is, by collapsing data points that apparently refer to the same entity into a single location, rather than treating data points that apparently refer, in substance, to the same place as if they referred to two different places. It is noted that the clustering action performed at block 216 is an optional pre-processing action; the process could be performed without this clustering. (However, it is also noted that all actions that are described herein and/or shown in the drawings are optional; any given claim calls for only those actions that are explicitly listed in that particular claim.)

At 218, entities are matched to particular data points. This matching process attempts to determine which data points (or plural data points) appear to refer to a particular entity. For example, if one of the entities is a Starbucks coffee house, then a microblog entry that says "I'm at Starbucks" is a data point that can be matched to the Starbucks entity. Moreover, an entry that says, "I'm drinking coffee" could also be matched to the Starbucks entity. It is noted that a data point that says, "I'm at Starbucks" could be deemed to match the Starbuck's entity with greater certainty than an entity that merely says, "I'm drinking coffee." However, as discussed in connection with subsequent blocks of FIG. 3, there may be plural data points that match the same entity, and it is possible (using techniques described below) to determine which of the data points will be chosen to represent the actual location of a given entity.

At 220, a score may be assigned to each match between an entity and a data point. The score represents a level of certainty that the data point is actually associated with the entity. Thus, if the entity to be matched is a Starbucks coffee house and the data point is a microblog entry that says, "I'm at Starbucks," then the data point may match the entity with a very high level of certainty (since it is unlikely that someone would say "I'm at Starbucks" unless they were actually at Starbucks). On the other hand, if the data point is an entry that says, "I'm drinking coffee," then the data point might match the Starbucks entity with a moderate level of certainty, since the person who creates such an entry might be at Starbucks, but could instead be at a different restaurant that serves coffee. The particular way in which scores are assigned could be determined using any appropriate technique. For example, a machine learning technique could be used to determine how to assign scores. Thus, an existing set of entities (e.g., Starbucks coffee houses) and data points could be examined to determine, for particular words or phrases that appear in data points (e.g., "Starbucks," "coffee," "latte," etc.), how likely those words or phrases are to be associated with a particular kind of entity. The score assignment algorithm could be trained on this type of data.

One each entity in a segment has been matched with its possible data points, and once the data points have been scored as described above 220, an optimal assignment of positions may be found (at 222). The optimal assignment of positions, in one example, is a way of choosing the locations of entities along a segment that maximizes the aggregate score of the entities, while also, possibly, maintaining certain physical constraints. FIG. 4 shows an example of how this assignment works.

Turning now to FIG. 4, it will be understood that the possible locations of entities are discrete. That is, after analyzing the data points associated with a segment, the entities are matched to data points (at 218 of FIG. 3). Thus, the possible locations of a given entity is not arbitrary positions along a segment; rather, the possible locations of a given entities are those locations associated with the data points that have matched the entity. As also explained above, after this matching process occurs, a given entity might have been found to match more than one data point, where each match can be assigned a "certainty score" reflecting the likelihood that the data point actually relates to the entity to which it is believed to relate. Thus, the process of optimizing the positions may involve choosing—from among the possible locations along a segment—the actual locations that maximize the aggregate certainty scores among the entities on that segment. FIG. 4 shows a specific example of this idea, using two entities.

In FIG. 4, the two entities (A and B) on a particular segment are known to have the addresses 12 Maple Avenue and 20 Maple Avenue. 12 Maple Avenue might be a Starbucks coffee house entity, and 20 Maple Avenue might be a McDonald's restaurant entity. 12 Maple Avenue has matched three data points 402, 404, and 406, which have three different locations. (Referring back to 216 in FIG. 2, note that a given data point might actually refer to a cluster of data points that were inferred to relate to the same entity; such data points might have been collapsed into a single data point. E.g., data point 402 might actually have been derived from several microblog entries that were made within a few feet of each other, or that were transmitted through the same WiFi router.) Each of the data points 402, 404, and 406 has a certainty score associated with it: 0.1, 0.5 and 0.2, respectively, in this example. Similarly, 20 Maple Avenue is associated with four data points 408, 410, 412, and 414, which have certainty scores 0.6, 0.2, 0.1, and 0.5 respectively. The geographic positions of these data points along segment 416 are shown by their positions. (Segment 416 may, for example, be the even side of Maple Avenue for addresses 0 through 99.)

Looking at the data points and their certainty scores, it can be seen that the sum of these scores can be maximized by assigning 20 Maple Avenue the location associated with data point 408, and 12 Maple Avenue the location associated with data point 404, which yields an aggregate score of 0.6+0.5=1.1. However, this assignment of locations might violate a physical condition that often applies to a streets: i.e., it places a higher number before a lower number. (The direction of the arrow beneath segment 416 in FIG. 4 shows building numbers ascending from left to right.) Thus, the process of assigning locations to the entities may search for a different solution. As can be seen, choosing data points 402 and 410 satisfies the condition that the street numbers increase monotonically throughout the segment, but this choice yields a much lower aggregate score of 0.1+0.2=0.3. The choice of data points 404 and 414, however, satisfies the monotonically increasing condition, and yields a score of 0.5+0.5=1.0. This score is the maximum score that can be achieved in the example shown while also satisfying the monotonically increasing condition. Thus, data points 406 and 414 represent an optimal solution.

Thus, returning to FIG. 2, the action performed at 222 seeks to find an optimal solution while, perhaps, also satisfying various physical constraints. Examples of these constraints include the idea that no data point would match two separate businesses (block 224), and also the idea that numbers along the street increase monotonically in some direction (block 226). As demonstrated above in connection with FIG. 4, the latter of these conditions (imposition of which is optional) implies that a sequence such as 12, 20, 32, 36, 72 is legitimate (as is 72, 36, 32, 20, 12, since that sequence increases in the opposite direction); but 12, 32, 20, 36, 72 would not be legitimate, since the numbers do not monotonically increase in one direction.

Once the optimal assignments of data points to business is chosen, a set of geographic coordinates for the entities is generated at 228. The geographic coordinates of an entity are the coordinates corresponding to the data point that the optimization process of 222 chooses for that business.

Figure 5:
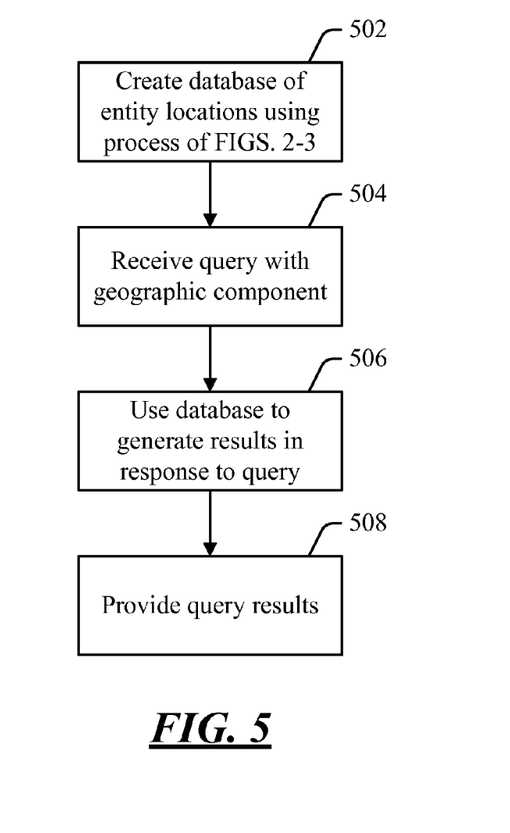
FIG. 5 is a flow diagram of an example process of responding to a search request with a geographic condition.

When a process (such as that described above) is used to assign geographic locations to entities, the assigned locations may be used in any manner. However, one example application of such a set of locations is responding to a search request with a geographic condition. FIG. 5 shows an example process of responding to such a search request.

At 502, a database of entity locations is created. Such a database may be created, for example, using the process described above in connection with FIGS. 2 and 3, although the database could be created using any appropriate process. At 504, a query is received, where the query has a geographic component. For example, "coffee 98052" is a query with a geographic component: it seeks "coffee", but it also specifies something geographic about the results that are sought (via the inclusion of "98052", which is the zip code for Redmond, Wash.). "Coffee Redmond, Wash." is another example of a query with a geographic component. Moreover, if something is known about the geographic context of the query (e.g., the user is entering the query on a wireless telephone whose current location is known, or the user has previously registered a particular city as his or her default location), then even the query "coffee" may be understood to have a geographic component, since the actual location would be implied (even if not expressly stated).

At 506, the database is used to generate results in response to the query. For example, the database might have a listing of all coffee houses and their associated locations. If the query seeks coffee houses in Redmond, Wash., then the query results can be a list of all coffee houses in Redmond, Wash. (or, for example, all coffee houses within a one-mile radius of the center of town). The results may also include maps to those coffee houses, showing the actual location of the coffee house on the map (or, at least, the location that has been inferred by a process such as that described above in connection with FIGS. 2 and 3). Additionally, the results might include, or link to, a street-level view of the coffee houses, and some type of visual markers (e.g., "push-pin" graphics or arrows) could be superimposed on the street-level imagery to show the actual (or presumed) location of a particular coffee house.

Regardless of the form that the results take, these results may be tangibly provided to a user at 508. For example, the results may be communicated to a user, or stored in a durable, non-transitory manner.

Figure 6:
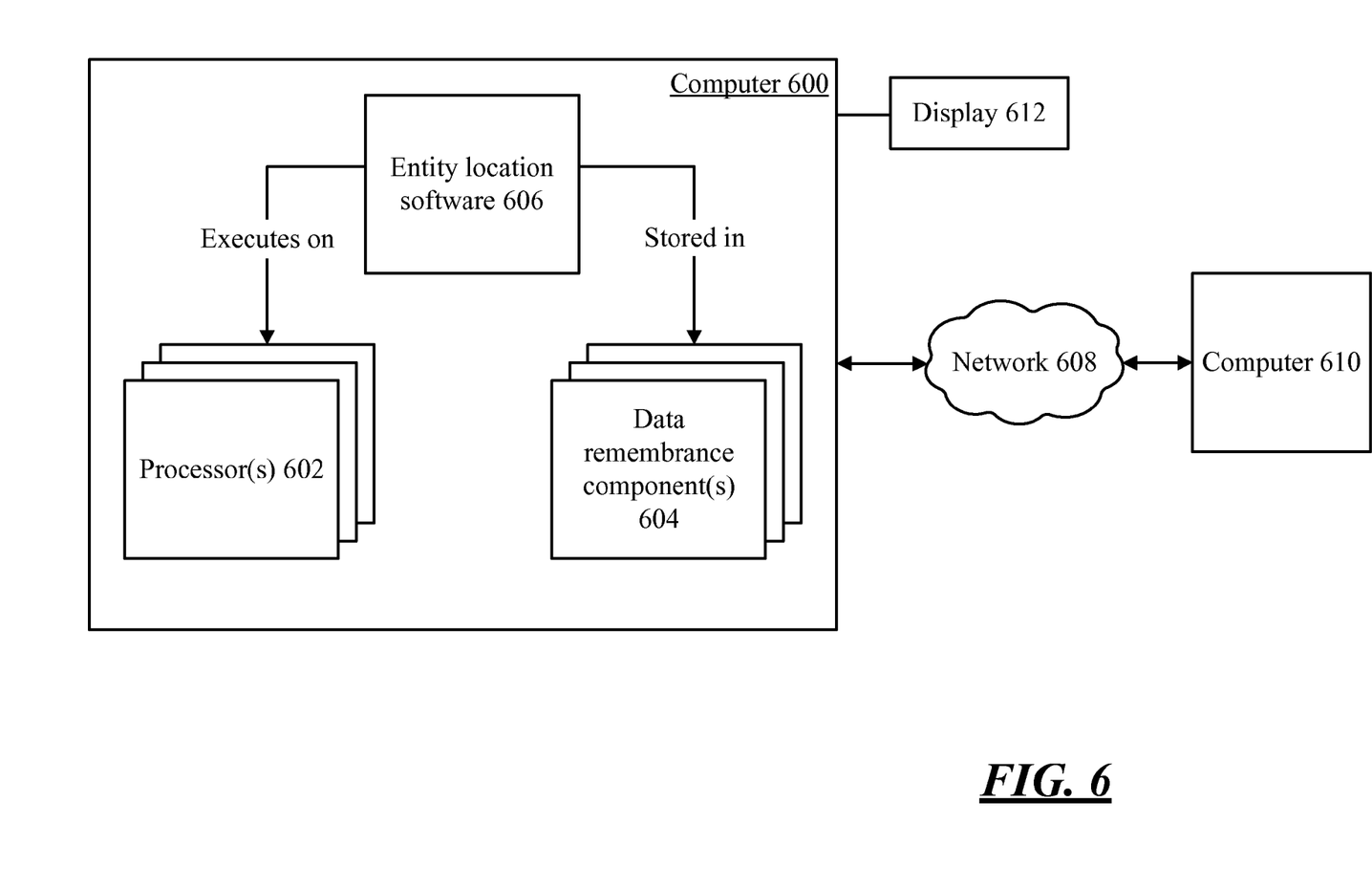
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is entity location software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of identifying locations of entities, the method comprising:
using a processor to perform acts comprising:
finding entities that fall within a segment of a map;
finding geo-tagged data points that fall within said segment of said map;
finding a set of matches between said entities and said data points;
for each match in said set of matches, assigning, to said match, a score that represents a level of certainty that a data point in said match corresponds to an entity in said match;
creating an optimal assignment of locations of said entity from among said set of matches, said creating of said optimal assignment comprising:
choosing locations, from among said set of matches, that result in a higher aggregate score than would result from any other choice of locations from among said matches, while satisfying a physical constraint;
based on said optimal assignment, generating location coordinates of said entities in said segment; and
storing said location coordinates in a database.

2. The method of claim 1, wherein finding entities and data points that fall within said segment comprises:
assigning an entity or data point to a segment based on said entity or said data point being closer to said segment than to any other segment.

3. The method of claim 1, wherein finding entities that fall within said segment comprises:
assigning an entity to said segment based on said entity having an address that falls within a numerical range, wherein said segment corresponds to addresses falling in said numerical range.

4. The method of claim 1, wherein said physical constraint comprises a condition that no two entities be at the same location.

5. The method of claim 1, wherein said physical constraint comprises a condition that address numbers increase monotonically in a direction through said segment.

6. The method of claim 1, wherein said acts further comprise:
clustering geo-tagged data points on said segment that satisfy a proximity criterion and that are determined to relate to the same entity.

7. The method of claim 1, wherein said map represents a street grid.

8. The method of claim 1, wherein said segment is a side of a street on one block of a street grid.

9. The method of claim 1, wherein a segment is defined as addresses on a street that are within a numerical range and are even numbers, or as addresses on said street within said numerical range that are odd numbers.

10. The method of claim 1, wherein said acts further comprise:
- receiving a search query that has a geographic component;
- using said database to generate a set of results in response to said query; and
- providing, to a user, said set of results.

11. The method of claim 1, wherein said data points comprise microblog entries, wherein each of said microblog entries comprises text provided by a user, and latitude and longitude coordinates of a location from which said microblog entry was made.

12. A system for identifying locations of entities, the system comprising:
- a memory;
- a processor; and
- a component that is stored in said memory and that executes on said processor, wherein said component assigns a set of entities and a set of geo-tagged data points to a segment of a street grid, said segment being an even or odd side of a street within a numerical range, wherein said component assigns said entities and said geo-tagged data points to said segment either based on addresses or based on geographic proximity of said entities and said geo-tagged data points to said segment, wherein said component creates a set of matches between entities and geo-tagged data point in the same segment and assigns, to each match in said set of matches, a score representing a level of certainty that a geo-tagged data point in said match corresponds to an entity in said match, wherein said component finds an assignment of locations of said entities, from among said matches, that creates a higher aggregate score than any other assignment of locations that satisfies a physical constraint, and wherein said component stores said set of locations in a database.

13. The system of claim 12, wherein said physical constraint comprises a condition that addresses of said entities increase monotonically in a direction through said segment.

14. A computer-readable memory that stores executable instructions for identifying locations of entities, the executable instructions, when executed by a computer, causing the computer to perform acts comprising:
- finding entities that fall within a segment of a map;
- finding geo-tagged data points that fall within said segment of said map;
- finding a set of matches between said entities and said data points;
- for each match in said set of matches, assigning, to said match, a score that represents a level of certainty that a data point in said match corresponds to an entity in said match;
- creating an optimal assignment of locations of said entity from among said set of matches;
- based on said optimal assignment, generating location coordinates of said entities in said segment;
- storing said location coordinates in a database; and
- clustering geo-tagged data points on said segment that satisfy a proximity criterion and that are determined to relate to the same entity.

15. The computer-readable memory of claim 14, wherein finding entities and data points that fall within said segment comprises:
- assigning an entity or data point to a segment based on said entity or said data point being closer to said segment than to any other segment.

16. The computer-readable memory of claim 14, wherein finding entities that fall within said segment comprises:
- assigning an entity to said segment based on said entity having an address that falls within a numerical range, wherein said segment corresponds to addresses falling in said numerical range.

17. The computer-readable memory of claim 14, wherein said segment is a side of a street on one block of a street grid.

18. The computer-readable memory of claim 14, wherein a segment is defined as addresses on a street that are within a numerical range and are even numbers, or as addresses on said street within said numerical range that are odd numbers.

19. The computer-readable memory of claim 14, wherein said acts further comprise:
- receiving a search query that has a geographic component;
- using said database to generate a set of results in response to said query; and
- providing, to a user, said set of results.

20. The computer-readable memory of claim 14, wherein said data points comprise microblog entries, wherein each of said microblog entries comprises text provided by a user, and latitude and longitude coordinates of a location from which said microblog entry was made.

* * * * *